UNITED STATES PATENT OFFICE.

WILLIAM M. EVANS, OF AMHERST, VIRGINIA.

MEDICATED POP-CORN

SPECIFICATION forming part of Letters Patent No. 415,192, dated November 19, 1889.

Application filed April 9, 1889. Serial No. 306,612. (No specimens.)

*To all whom it may concern:*

Be it known that I, WILLIAM M. EVANS, a citizen of the United States, residing at Amherst, in the county of Amherst and State of Virginia, have invented a new and useful Composition of Matter to be Used Both for a Food and Medicinal Purposes as Medicated Pop-Corn, of which the following is a specification.

My composition consists of the following ingredients and is prepared as follows: The popped corn is first dipped in or saturated with metheglin, then covered with honey, then put into balls, bars, sticks, or other convenient forms for use, and may be flavored with winter-green, peppermint, sassafras, horehound, or other flavoring extracts to suit taste. The metheglin, being prepared from pure honey and a mixture of the mineral waters of Virginia, acts as a mild tonic, assisting and strengthening the stomach to overcome or prevent indigestion, and when aided by the saliva, which is formed and carried into the stomach by the eating of the popped corn, bad cases of dyspepsia may be cured. The honey gives additional healing powers to the system, and especially acts to heal inflamed conditions of the mouth, throat, bronchial tubes, and stomach. One great advantage of taking honey this way for medicinal purposes is that only a small amount of this most concentrated natural food product is taken while eating the corn, yet its healing powers are perfectly and slowly brought in contact with the mouth, throat, and stomach.

What I claim, and desire to secure by Letters Patent of the United States, is—

The herein-described medicated popped corn, consisting of balls, bars, sticks, or other like form of popped corn saturated with metheglin, honey, and a suitable flavor, substantially as set forth.

W. M. EVANS.

Witnesses:
CH. L. ELLIS,
H. W. WILLS.